US008401883B2

(12) United States Patent
Villarreal

(10) Patent No.: US 8,401,883 B2
(45) Date of Patent: Mar. 19, 2013

(54) MAINTAINING VIABLE PROVIDER-CLIENT RELATIONSHIPS

(75) Inventor: Carla Villarreal, Winchester, VA (US)

(73) Assignee: Transitions in Progress LLC, Winchester, VA (US)

(*) Notice: Subject to any disclaimer, the term of this patent is extended or adjusted under 35 U.S.C. 154(b) by 215 days.

(21) Appl. No.: 12/662,014

(22) Filed: Mar. 29, 2010

(65) Prior Publication Data
US 2010/0250339 A1 Sep. 30, 2010

Related U.S. Application Data

(60) Provisional application No. 61/211,402, filed on Mar. 30, 2009.

(51) Int. Cl.
G06Q 10/00 (2012.01)
G06F 15/16 (2006.01)

(52) U.S. Cl. .................. 705/7.11; 705/7.42; 705/7.15; 705/320; 709/200; 709/204

(58) Field of Classification Search .............. 705/1.1, 705/7.15, 7.42, 322, 8, 10, 12; 709/200, 709/204
See application file for complete search history.

(56) References Cited

U.S. PATENT DOCUMENTS

| 7,184,966 | B1* | 2/2007 | Parsonnet et al. | 705/7.26 |
| 7,483,842 | B1* | 1/2009 | Fung et al. | 705/7.14 |
| 7,536,310 | B2* | 5/2009 | Klausnitzer | 705/7.11 |
| 7,606,783 | B1* | 10/2009 | Carter | 706/50 |
| 2001/0037363 | A1* | 11/2001 | Battilega et al. | 709/204 |
| 2002/0138546 | A1* | 9/2002 | Parsonnet et al. | 709/200 |
| 2002/0161595 | A1* | 10/2002 | Cepeda | 705/1 |
| 2003/0009373 | A1* | 1/2003 | Ensing et al. | 705/10 |
| 2003/0220830 | A1* | 11/2003 | Myr | 705/10 |
| 2004/0186765 | A1* | 9/2004 | Kataoka | 705/10 |
| 2005/0021392 | A1* | 1/2005 | English et al. | 705/12 |
| 2007/0192163 | A1* | 8/2007 | Barr | 705/10 |
| 2007/0239508 | A1* | 10/2007 | Fazal et al. | 705/8 |
| 2008/0249824 | A1* | 10/2008 | DiBernardino et al. | 705/8 |
| 2009/0276296 | A1* | 11/2009 | Spriegel | 705/11 |
| 2010/0100427 | A1* | 4/2010 | McKeown et al. | 705/11 |
| 2010/0235228 | A1* | 9/2010 | Torress | 705/11 |

OTHER PUBLICATIONS

Herbert A. Simon, A Formal Theory of the Employment Relationship, Econometrica, vol. 19, No. 3 (Jul. 1951), pp. 293-305, Published by: The Econometric Society Stable URL: http://www.jstor.org/stable/1906815.*

(Continued)

Primary Examiner — Jason B Dunham
Assistant Examiner — Nancy Mehta
(74) Attorney, Agent, or Firm — Clifford D. Crowder

(57) ABSTRACT

A process for enhancing the relationship between a service provider and a client is disclosed. A first data set of feedback from employees of the service provider regarding service provided by the service provider to the client is received via machine interface. A second data set of feedback from a client regarding services provided by the service provider to the client also is received via machine interface. An analysis of the first and second data sets is implemented via a computer programmed to compare the first and second data sets and assess areas of similarity and areas of difference between the first and second data sets. A strategy is developed based on the analysis for the service provider to enhance areas of similarity and reduce differences between the first and second data sets. The strategy is implemented in the relationship between the service provider and the client.

3 Claims, 7 Drawing Sheets

OTHER PUBLICATIONS

Lemieux T, MacLeod W, Parent D. Contract Form, Wage Flexibility, and Employment. American Economic Review [serial online]. May 2012;102(3):526-531. Available from: Business Source Complete, Ipswich, MA. Accessed Jan. 12, 2013.*

Amanuel G. Tekleab and M. Susan Taylor, Aren't There Two Parties in an Employment Relationship? Antecedents and Consequences of Organization-Employee Agreement on Contract Obligations and Violations Journal of Organizational Behavior, vol. 24, No. 5, Special Issue: Employment Relationships: Exchanges between Employees and Employers (Aug. 2003), p.*

Enterprise Feedback Management. Website [online]. Mindshare Technologies, date not indicated [retrieved on Feb. 6, 2012]. 2 pages—retrieved from the Internet: URL: http://www.mshare.net/solutions/efm.html.

Enterprise Feedback Management. Archived webpage [online]. Mindshare Technologies, May 27, 2009 [retrieved on Feb. 6, 2012]. 2 pages—retrieved from the Internet: URL: http://www.archive.org/web/20090527235629/http://www.mshare.net/solutions/efm.html.

* cited by examiner

MAINTAINING VIABLE PROVIDER-CLIENT RELATIONSHIPS

This application claims the benefit of U.S. Provisional Application No. 61/211,402, filed Mar. 30, 2009, the entire contents of which are hereby incorporated by reference.

TECHNICAL FIELD

The present disclosure relates to business relationships between a product or service provider and a client, and more particularly, to a method of maintaining, enhancing, and/or improving business relationships between a product or service provider and a client.

BACKGROUND

Many businesses, government agencies, organizations, etc., operate in relationships with other businesses, government agencies, organizations, groups of individuals, etc., in what may generically be deemed a relationship between a provider and a client. For example, a business may provide one or more products and/or services to another business under a contractual relationship. As additional examples, a government agency, business, or organization may provide services to a group of individuals, such as customers, students, patients, etc.

Presently, a provider of products and/or services may have only intermittent and/or limited access and visibility into a client's perception of work performed by the provider. A common method of obtaining data from a client is via electronic surveys without reference or comparison to the product or service provider's own employee input. There is no cross referencing of problematic areas in the relationship to validate areas of concern and potential improvement. Further, data collected from surveys is often only a single perspective (that of the client) answering such mundane questions as: (1) is the client happy, (2) would they buy from the service provider again, (3) would the client recommend the service provider to others?

While such generic questions may provide important information, they give only a snapshot or "moment in time" perspective, usually as an annual or semi-annual barometer of customer satisfaction versus a dynamic launching pad for improved customer service. It would be useful to implement a repeatable process including collecting data, for example through personal interviews, from both the service provider and client, and to include extensive analysis of the data to develop actionable issue resolution in common areas of concern. In other words, it would be useful to develop a hybrid perspective of actionable items based on data collected from both the service provider and the client.

The disclosed process includes improvement over existing processes.

SUMMARY

In one aspect, a process for enhancing the relationship between a service provider and a client is provided. The process includes receiving via a machine interface a first data set of feedback from employees of the service provider regarding service provided by the service provider to the client. The process also includes receiving via a machine interface a second data set of feedback from a client regarding services provided by the service provider to the client. The process also includes implementing an analysis of the first and second data sets via a computer programmed to compare the first and second data sets and assess areas of similarity and areas of difference between the first and second data sets. The process also includes developing a strategy, based on the analysis, for the service provider to enhance areas of similarity and reduce differences between the first and second data sets. The process additionally includes implementing the strategy in the relationship between the service provider and the client.

In another aspect, a process to aid a product or service provider in maintaining a viable relationship between the provider and a client is provided. The process includes conducting a customer service audit by an independent consultant, the audit including conducting interviews with employees of the provider and conducting interviews with employees of the client. The process also includes collecting feedback data regarding the relationship from the perspective of employees of the provider and employees of the client into a database. The process also includes analyzing feedback data from the database via a computer implemented program configured to develop metrics representative of positive and negative aspects of the relationship. The process also includes providing real time feedback to employees of the provider based on the analysis. The process also includes developing a strategy, based on results of the analysis, to enhance positive aspects of the relationship and mitigate negative aspects of the relationship. The process additionally includes implementing the strategy in the relationship between the provider and the client.

In another aspect, a process for mitigating risks of termination of a relationship between a service provider and a client is provided. The process includes receiving via a machine interface a first data set from employees of the service provider regarding service provided by the service provider to the client. The process also includes receiving via a machine interface a second data set representing a client viewpoint regarding services provided by the service provider to the client. The process also includes implementing an analysis of the first and second data sets via a computer programmed to compare the first and second data sets and assess areas of similarity and areas of difference between the first and second data sets. The process also includes developing a strategy, based on the analysis, for the service provider to mitigate risks of termination of the relationship by enhancing areas of similarity and reducing differences between the first and second data sets. The process additionally includes implementing the strategy in the relationship between the service provider and the client.

In another aspect, a process for risk mitigation and assessment in a relationship between a service provider and a client is provided. The process includes receiving via machine interface a first data set from employees of the service provider regarding services provided by the service provider to the client. The process also includes receiving via machine interface a second data set from employees of the client regarding service provided by the service provider to the client. The process also includes implementing an analysis of the first and second data sets via a computer programmed to compare the first and second data sets and assess areas of similarity and areas of difference between the first and second data sets. The process also includes developing a strategy, based on the analysis, for the service provider to assess and mitigate risks to the relationship between the service provider and the client. The process additionally includes implementing the strategy in the relationship between the service provider and the client.

In a further aspect, a process for a product or service provider to increase the probability of maintaining a contractual relationship between the provider and a client is disclosed. The process includes securing, by the provider, the services of a third-party consultant. The process also includes obtaining, by the provider, authority from the client for the consultant to interview employees, of the client regarding aspects of the product or service provided under the contractual relationship by the provider. The process also includes interviewing, by the consultant, employees of the provider associated with the contractual relationship. The process also includes collecting, by the consultant, feedback data from the employees of the provider regarding aspects of the product or service and the contractual relationship. The process also includes identifying, based on interviewing employees of the provider by the consultant, employees of the client associated with the contractual relationship. The process also includes interviewing, by the consultant, at least the identified employees of the client associated with the contractual relationship. The process also includes collecting, by the consultant, feedback data from the employees of the client regarding aspects of the product or service and the contractual relationship. The process also includes providing to the provider, by the consultant, interim reports to the provider regarding feedback data received from the employees of the client. The process also includes identifying, based on feedback data from the employees of the provider and the employees of the client, positive and negative aspects of the contractual relationship. The process also includes developing, by the consultant, reports categorizing feedback data into positive and negative aspects or the contractual relationship, highlighting areas of concern to the probability of maintaining the contractual relationship, and establishing actionable items to increase the probability of maintaining the contractual relationship. The process also includes assigning the actionable items to management teams of the provider for discussion with the client. The process additionally includes identifying, by the consultant, aspects of feedback data collected from the employees of the provider and the employees of the client relevant to bids by the provider for renewing a contractual relationship with the client.

DETAILED DESCRIPTION

Figure 1:
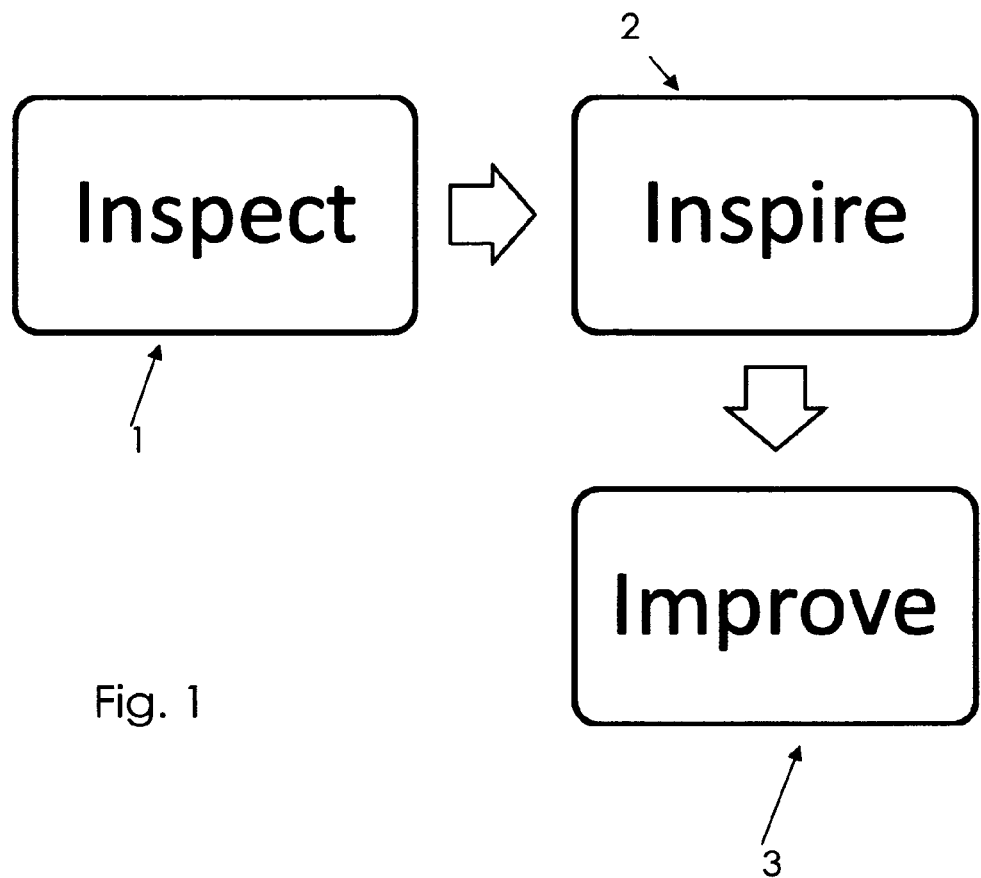
FIG. 1 is a diagrammatic illustration showing three aspects or phases of a process under the disclosure.

The disclosed process may include three broad aspects or phases. Referring to FIG. 1, the three aspects or phases may include Inspect (block 1), Inspire (block 2), and Improve (block 3). Inspecting may involve obtaining client approval to proceed with a customer service audit, conducting an audit of service provider employees, and conducting an audit of the client employees. Inspiring may involve taking action from the input of both the service provider employees and the client employees. Improvement may include the fruits of the audit, such as the continuing actions that increase customer trust and the improvements in customer service.

Figure 2:
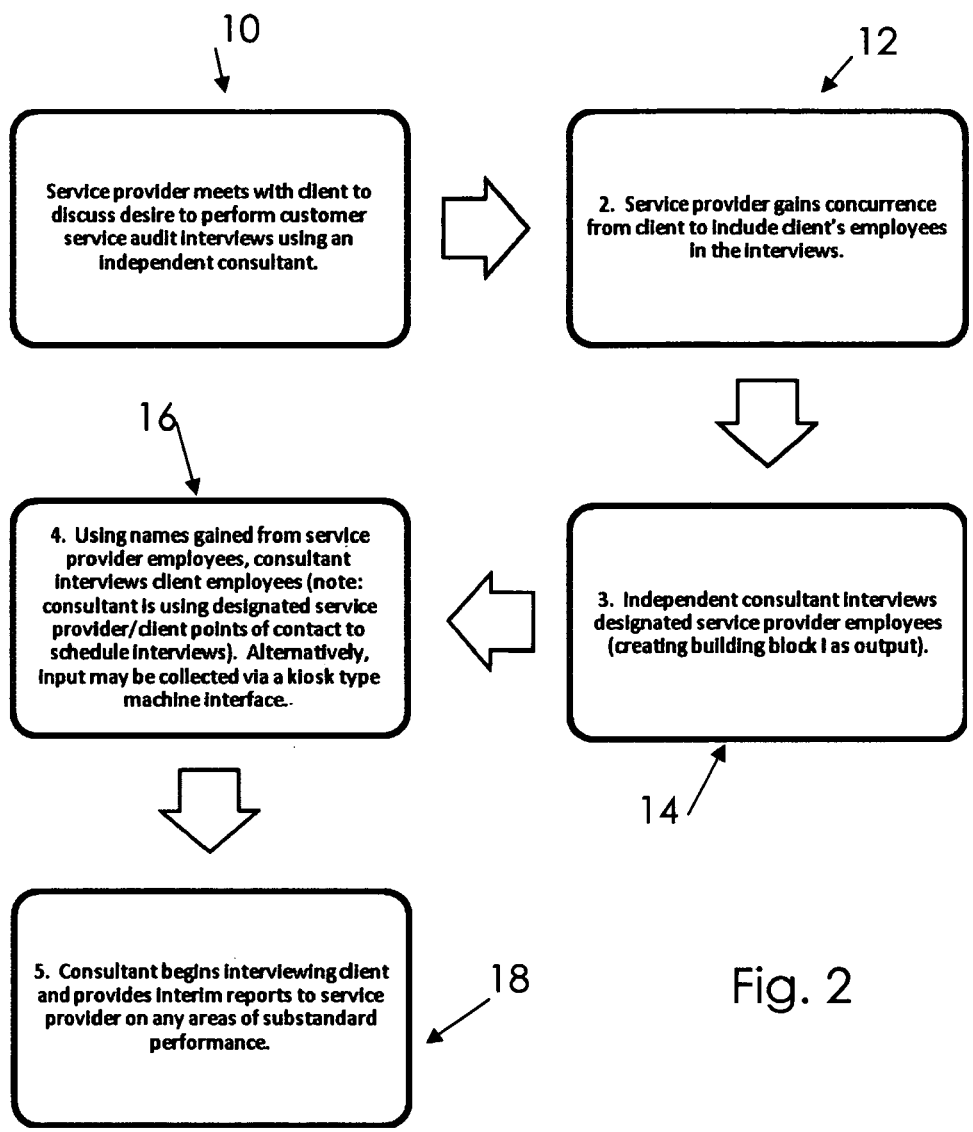
FIG. 2 is a block diagram illustrating steps or actions of one aspect or phase of a disclosed process.

Referring to FIG. 2, the aspect or phase of Inspect may include a plurality of steps or actions. At block 10, the service provider may meet with a client to discuss the desire to perform customer service audit interviews through an independent third-party consultant. At block 12, the service provider may gain concurrence from the client for the consultant to interview client employees. At block 14, the third-party consultant may interview designated employees of the service provider. This may result in what may be designated as building block I, to be discussed further in connection with FIG. 5. Information obtained during the interviews with service provider employees may enable the consultant to identify employees of the client with whom client employee interviews may be scheduled.

The third-party consultant may use designated service provider/client points of contact to schedule interviews with client employees. Still referring to FIG. 2, at block 16, using names gained from service provider employees, for example, the consultant may interview client employees. At block 18, the consultant may begin and continue interviewing client employees, and may provide interim reports to the service provider, for example identifying any areas of substandard performance that may come to light as a result of the interviews. In this way, the service provider may be made aware of areas or items of concern on an on-going basis before the interview process is completed. As a result, corrective measures may begin at the earliest possible time.

Figure 3:
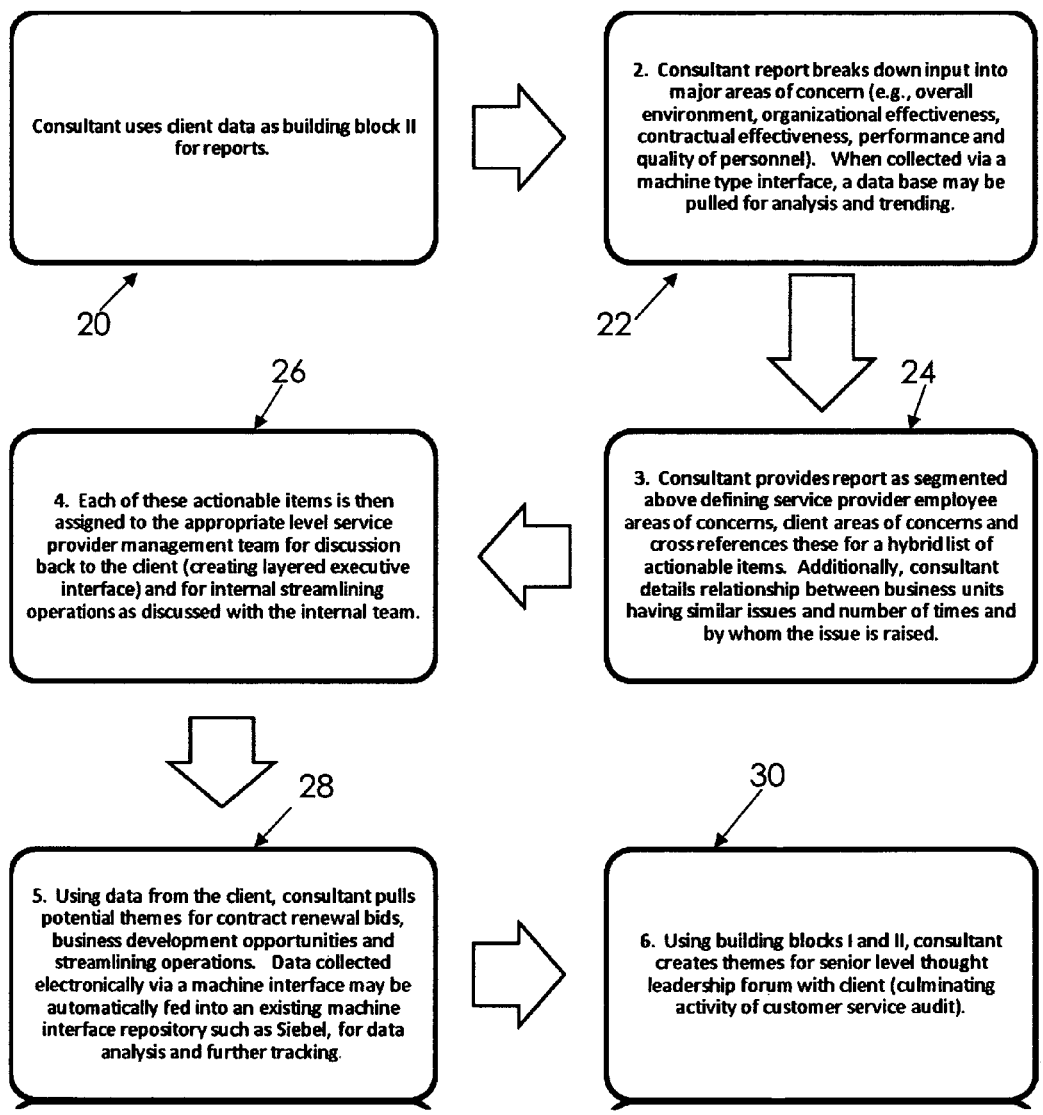
FIG. 3 is a block diagram illustrating steps or actions of another aspect or phase of a disclosed process.

Referring to FIG. 3, the aspect or phase of Inspire may include a plurality of steps. At block 20, the consultant may employ client data to formulate reports. This may result in what may be designated as building block II, to be discussed further in connection with FIG. 5. At block 22, the report(s) formulated by the consultant may break down the client input/feedback into major areas of concern. For example, the report may categorize data into overall environment, organizational effectiveness, contractual effectiveness, performance, and quality of personnel.

Still referring to FIG. 3, at block 24, the consultant may provide report(s), for example categorized into overall environment, organizational effectiveness, contractual effectiveness, performance, and quality of personnel, defining service provider employee areas of concern and client areas of concern. Such report(s) may cross reference data for a hybrid list of actionable items. Additionally, the consultant may detail relationships between business units having similar issues with designation of the number of times such issues arose. The report(s) also may indicate the particular client or service provider employee who raised an issue.

Referring to block 26 of FIG. 3, each identified actionable item may then be assigned to an appropriate level service provider management team for discussion with the client. This may create what may be designated layered executive interface. The discussions may lead to internal streamlining operations aimed at resolving problem areas. At block 28, the consultant may employ data obtained from the client to develop potential themes for contract renewal bids, business development opportunities, and streamlining operations.

Figure 5:
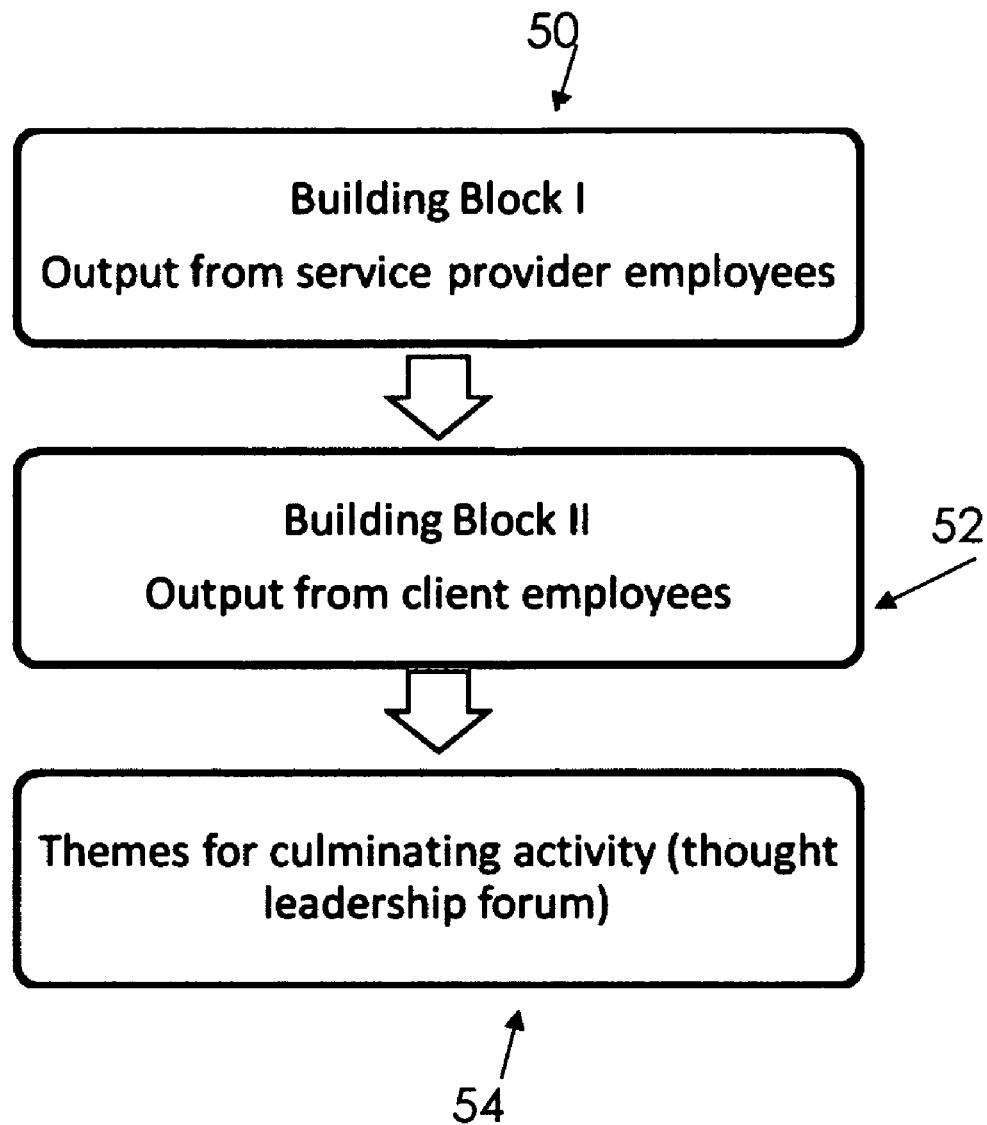
FIG. 5 is a diagrammatic illustration of the relationship of certain aspects of a disclosed process.

Referring to block 30 of FIG. 3, the consultant may employ building blocks I and II to create themes for a senior level thought leadership forum with client. This may be the culminating activity of the customer service audit. FIG. 5 diagrammatically illustrates the embodiment of employing building blocks I and II. Referring to FIG. 5, building block I including output from service provider employees, at 50, may be combined with building block II including output from client employees, at 52, to derive appropriate themes for a culminating activity of the disclosed process in the form of the thought leadership forum, at 54, described above.

The disclosed process includes combining the data from data sets derived both from the service provider and from the client to identify areas for improvement on current contracts and areas for improvement within the corporation generally. The data supports program managers, sales and capture organizations, and other aspects and units of a business. The data may be employed as an automated decision tool wherein it may be accessed by current customer relationship management (CRM) software packages, such as Siebel or Cognos, using business rules to auto-populate existing data repositories. In this way, the data may become a real time playbook for improving customer awareness, personal behaviors, and other business concerns. In addition, metrics derived from the data may be openly posted, for example on widescreen monitors in service provider employee areas, to show active process improvement in providing customer service.

Figure 4:
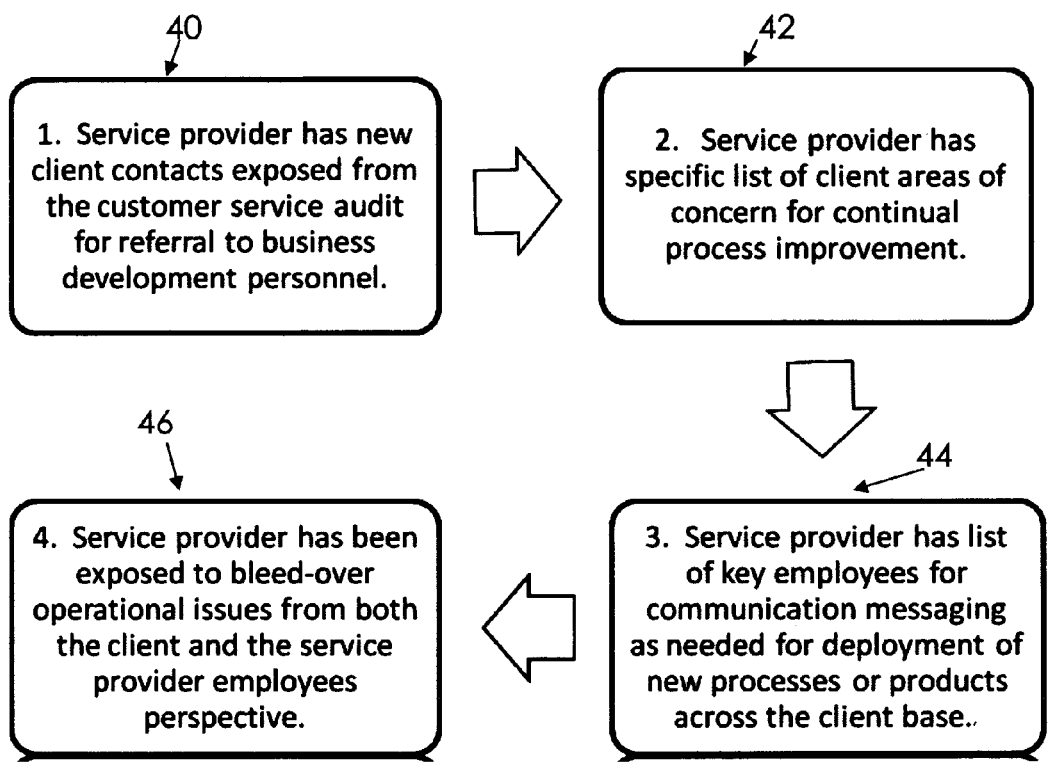
FIG. 4 is a block diagram illustrating steps or actions of an additional aspect or phase of a disclosed process.

Referring to FIG. 4, the aspect or phase of Improve may include a plurality of steps. At block 40, the service provider may have been exposed to new client contacts, identified during the customer service audit, for referral to business development personnel within the service provider company. In addition, at block 42, the service provider may have a specific list of client areas of concern for continual process improvement. The service provider, at block 44, may have a list of key employees to communicate with in connection with deployment of new processes, services, products, etc., to the service provider's client base. The service provider, at block 46, may have been exposed to larger operational issues within the service provider company from the perspective of both client employees and service provider employees.

In the aspect or phase of inspect described in connection with FIG. 2, a triadic partnership including the service provider, the client, and the independent consultant is established. The service provider and the client may be viewed as the lead entities in the customer service endeavor, with the consultant acting in a support role. The service provider is the initiator of the customer service audit, approving questions for its own employees and for the client, and providing points of contact for the consultant to schedule interviews. The client is a participant in the audit and the designator of subordinate points of contact to schedule interviews. The consultant is the human instrument of data collection and analysis and the creator of surveys. Sample surveys will be described below. As described above, certain aspects of data collection and analysis may be aided via machine interface and computer program analysis where appropriate In the aspect or phase of Inspire described in connection with FIG. 3, the consultant employs the data obtained to begin segregating the issues according to category (e.g., overall environment, organizational effectiveness, contractual effectiveness, performance, quality of personnel, etc.) and priority for resolution. Both client and provider employees may be inspired during this period (a) by being given the opportunity to vent and/or make recommendations, (b) by receiving tangible feedback that their input is heard, and (c) by gaining momentum on their ideas based on similar input being received from either multiple entities within the service provider's work environment or from the customer perspective.

In the aspect or phase of Improve described in connection with FIG. 3, the service provider is able to use the fruits of the audit as the launching pad for further discussions with the client, gaining access to individual client interfaces (e.g., increased sales and business development access) that may not have been available before. This may enable the service provider to host new company ideas among a group of known (in view of the data collected) client supporters. Further, the service provider may be able to explore areas of unexpected consequence relative to contract performance and take on-going corrective action to ensure satisfaction by the client.

While an embodiment of the process wherein the various steps or actions may be carried out in a certain order has been described and illustrated, it will be understood that some of the steps or actions may be omitted and/or the steps or actions may be performed in a different sequence. For example, the process may begin at 20, as illustrated in FIG. 2, by obtaining client concurrence to proceed. In the event the client declines participation in the audit, the service provider has indeed learned something of value; possibly indicating a serious level of client dissatisfaction. Nonetheless, the audit should proceed, focusing on the service provider internal employees. The service provider should select key members of the staff to additionally answer the questionnaire prepared for the client from their own perspective in order to gain a basic understanding of possible client concerns. While omission of the client interviews may not yield the desired ability to cross-reference data as described in the disclosed process, it may give the service provider preliminary insight into key issues surrounding customer service.

As another example, and referring to FIG. 3, block 30, formation of the thought leadership forum could begin following the interviews of both client employees and service provider employees (FIG. 2, blocks 14 and 18). Alternatively, creation of the thought leadership forum may be omitted, for example in situations where the client may decline to participate. Furthermore, while an embodiment has been disclosed in which service provider employees may be interviewed before client employees are interviewed (FIG. 3), it will be understood that in an alternative embodiment, the client employees may be interviewed prior to the service provider employees.

Any suitable number of participants in both the client employee interviews and the service provider employee interviews may yield beneficial results. However, it has been determined that the minimum number for both client employees and service provider employees may be five.

Figure 6:
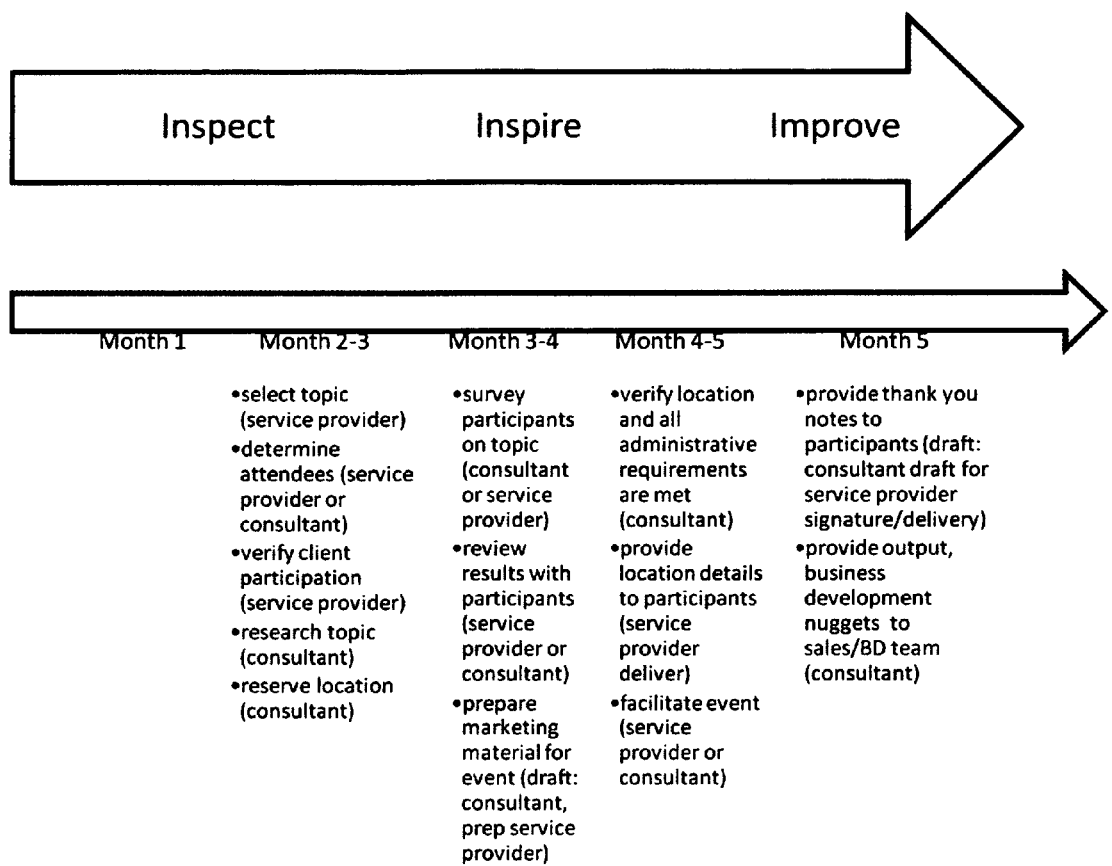
FIG. 6 is a diagrammatic illustration of an exemplary timeline for a disclosed process.

FIG. 6 is a diagrammatic illustration indicating an exemplary timeline showing possible concurrent actions during preparation of the thought leadership forum. The indicated timeline is merely an example, and times will vary depending on the scope of work. As indicated in FIG. 6, the overall process of Inspect, Inspire, and Improve may proceed over a number of months. Concurrently, as the Inspect phase is being completed, preparation for the thought leadership forum may begin. Completion of the thought leadership program may occur as the Improve phase winds down.

In some embodiments, the third-party consultant at least in part may effectively and advantageously be a virtual consultant. For example, while interviews with client employees by a person may be more effective in terms of observing the nuances of communication in a one-on-one situation, under some circumstances it may be more feasible and effective to employ machine interfaces. For example, a kiosk system including one or more interactive kiosks may effectively serve as a virtual consultant and supplement the overall responsibilities of the third-party consultant.

Such machine interfaces, e.g., interactive kiosks, may be made accessible to the client employees. In such a situation, client employees may be encouraged to answer designated questions, with the answers being suitably stored in one or more databases. As an example, it may be more feasible and effective to employ machine interfaces in embodiments where the client includes customers, patients, students, etc., instead of employees of a business client.

In the health care industry, in the transportation industry, or in education, for example, suitable machine terminals may be provided to serve as a virtual consultant. One or more interactive kiosks may be made conveniently accessible to customers in the transportation industry, patients in the health care industry, students and/or parents in the education system, or other groups of individuals who may be encouraged to answer designated questions, with the answers being suitable stored in one or more databases.

A virtual consultant may develop useful data sets based on client employee input and service provider employee input. Data thus derived from client employees, for example via a web-based interactive kiosk, may enable identification of trends in relation to specific time periods. This data may then be employed to direct the consultant to specific service provider employees working during time periods in which negative client input/feedback is shown to be most prevalent. This aspect of the disclosed process may employ the machine interface collected data during the Inspect phase of the disclosed process.

Answers to questions on questionnaires prepared by the third-party consultant may be entered verbally, by keyboard, by touch screen, or via other computer interface. The data thus gathered may be grouped and analyzed via a suitable software program, or analysis may be conducted in part with software and in part manually. In some circumstances, in addition to initial employee interviews by the consultant, it also may be desirable to make appropriate interactive kiosks or other machine interfaces available for employees to provide additional or follow-up feedback.

Figure 7:
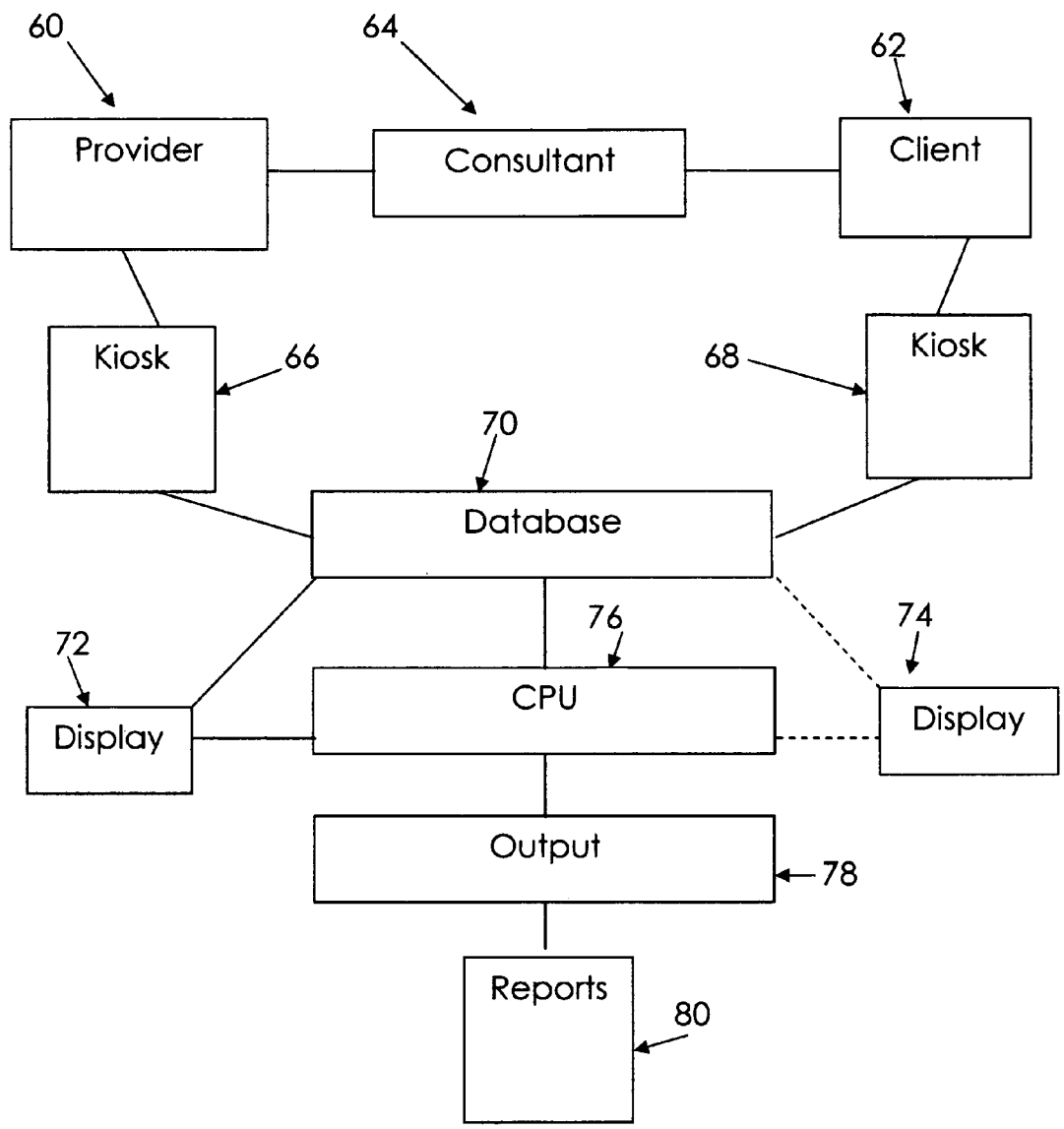
FIG. 7 is a schematic diagram illustrating aspects of an exemplary embodiment of the disclosed process.

FIG. 7 is a block diagram schematically illustrating aspects of one exemplary embodiment of the disclosed process. Referring to FIG. 7, provider 60 may be in a relationship, e.g., under contract to provide a product or service, with a client 62. A consultant 64 may be under contract with provider 60 to take measures to assess and enhance the relationship, e.g., by assessing perceptions of customer service and making recommendation to improve the relationship. The consultant may interact both with employees of the provider and with employees of the client. A kiosk system including interactive kiosks may be established, with kiosk 66 made conveniently available to relevant provider employees, and kiosk 68 make conveniently available to relevant client employees. It will be understood that kiosks 66, 68 may each include a plurality of interactive kiosks.

Questionnaires, prepared by the consultant, may be available via kiosks 66, 68 for employees to access and provide answers, for example via a touch screen and keyboard. Data collected via kiosks 66, 68 may be fed to a database 70. Individual data items may be selectively retrieved for real time display at display 72 conveniently made available to provider employees, thus giving immediate notification of client perceived deficiencies. Additionally, client employees may be provided with real time display 74. Data from database 70 may be fed to central processing unit (CPU) 76 for analysis, including, for example, categorizing and comparing differences and similarities between provider and client answers.

Analyzed data may be fed to an output device 78, e.g., a monitor, a printer, etc., from CPU 76. Consultant 64 may employ data retrieved at output 78 to formulate suitable reports 80 with recommendations of actionable items to be implemented by the provider to mitigate risks to the relationship and/or enhance the relationship. CPU 76 may include a computer implemented program configured to develop metrics representative of positive and negative aspects of the relationship. Metrics derived from the analysis may be displayed on display 72 for the provide employees. Metrics also may be displayed on display 74 for the client employees in circumstances where such display may be desirable.

In situations wherein a machine-interface is considered a more feasible alternative for collecting data, customer participation in the surveys may be dependent on user ease and convenience of survey submission. It is desirable that the service provider understand the work environment that evokes an emotional (positive and/or negative) response from the client. Meaningful input should be viewed over a period of time rather than merely in a moment in time inasmuch as any changes initiated by the service provider should result from systemic problems rather than an isolated issue. A convenient time for user input should be identified to facilitate ease of survey submission and ensure participation. Follow on evaluation of user experience by both service provider and client should occur. Results should be posted in order to provide immediate feedback to the user.

Practical Applicability

The disclosed method may be implemented to facilitate fusion of a tenuous relationship between a provider of products and/or services and a client into a more permanent and bonded relationship. Collecting appropriate data from both a product or service provider and from a client regarding performance of a product or service, contractual or otherwise, may bolster the value of the collected data as an indicator of customer service. Analysis of the data collected from both the service provider and from the client with real time posting of results and follow-on corrective action as indicated by the data will enhance the relationship and tend to render that relationship more likely to be long term or permanent.

In an exemplary embodiment, the disclosed method may be implemented in the environment of one company providing a product or service to another client company under a contractual relationship. The provider may have an interest in maintaining the contractual relationship, enhancing the contractual relationship, assessing and mitigating risks to the contractual relationship, renewing the contractual relationship, and entering into further contractual relationships with the client. The provider may engage an independent third-party consultant with a view toward collecting and analyzing data relevant to the relationship, and taking real time action based on the data and the analysis to maintain, enhance, and otherwise fuse the bond between the provider and the client.

The consultant may conduct a customer service survey that includes implementing a questionnaire, prepared by the consultant, with relevant employees of the provider, and another questionnaire, also prepared by the consultant, with relevant employees of the client, for example employees identified by the provider employees. In this regard, it may sometimes be more feasible and appropriate to employ a virtual consultant in the form of a machine interface, for example a kiosk system including interactive kiosks, to implement the questionnaire and collect data from the client employees. Data analysis, including categorizing data and cross-referencing provider data with client data, may be accomplished via a suitable computer programmed with software configured to categorize the data and compare areas of difference and similarity between provider and client answers.

The provider and/or the client may be provided with real time notification of areas of satisfaction and/or dissatisfaction. For example, provider employees may be made aware of survey results via displays in a common work area. In this way, some items may be addressed immediately. Other items, after data analysis, may be employed in developing strategies for addressing them in the longer term. Ultimately, a follow-on thought leadership forum including appropriate level employees of the provider and client may employ the analyzed data hybrid from both provider and client employees to enhance the contractual relationship and increase the probability of longer term relationships, such as renewed contracts.

In another exemplary embodiment, the disclosed method may be implemented in the environment of an airport. A third-party consultant may create a customer survey to be accessed and completed, at a suitable interactive kiosk. A kiosk system may include interactive kiosks strategically placed in areas where customers may typically have time to complete the survey. For example, the kiosks may be placed at airline waiting areas. The automated data collection receptacle in the form of the machine interface at the kiosks may provide suitable structure to collect and trend information on a large scale. Based on the trends identified, Transportation Safety Authority (TSA) employees may be interviewed either via suitable interactive kiosks or via personal interviews with the consultant. The data may be automatically tracked and compared via a database for common areas of concern to be uploaded into a decision tool repository. This repository may be accessed using business rules to auto-populate current customer collection tools such as Cognos or Siebel, providing a live, active status of customer sentiment on a recurring basis.

In another exemplary embodiment, the disclosed method may be implemented in the environment of an education system. In such a scenario, the service provider may be the school administrators or teachers and the client may be the students or parents. A third-party consultant again may create the survey for the students or parents to be accessed and completed at conveniently located interactive kiosks. The service provider employees, for example the teachers and administrators, may be interviewed by the third-party consultant or via machine interface at interactive kiosks. In addition to the benefit of collecting data leading to general systemic improvement of the education system, an added benefit would follow from identifying common areas of educational need among different types of learners. Identifying common interest areas across different types of learners could provide core areas for funding and system improvement.

In other exemplary embodiments, the disclosed method may be implemented in health care environments, such as hospitals, and in restaurants, for example. In the areas of both transportation (discussed above) and health care, customers (e.g., patients) and employees (e.g., doctors and nurses) may be interviewed via strategically placed interactive kiosks and data analysis portals. In the area of restaurants, machine interfaces suitably sized for table use, e.g., portable devices for hand use brought to the table by waiters or waitresses, may be employed by customers to enter data. In this way, real-time input by customers may be collected for comparison with data collected from the staff serving at times where deficiencies were noted.

The disclosed embodiments may produce common action-items relevant to both a product or service provider and a client, business development leads, increased substantive executive layered interface, validated themes for contract renewal development, and contract modification and internal process streamlining, for example. Conventional automated tools presently in use do not provide recurring live input. The disclosed method could serve as an automated decision tool with software enhancements to auto-populate existing static customer data in other repositories.

The disclosed method is an improvement over current processes employed to gauge customer satisfaction in that it provides building blocks for strengthening the relationship with the customer, for example in terms of follow on thought leadership forums, substantive executive layered interface (e.g., communications to the customer from executives ranging from a program manager to the company president), business development opportunities, validated themes for contract renewal development, contract modification, and internal process streamlining.

An objective of the service provider employee survey is to determine the employee's effectiveness in providing customer support and to uncover areas which hinder that effectiveness. Related objectives are to determine or validate the strength of the relationship with the customer and to identify areas for improvement in employee satisfaction.

Typical questions for an exemplary service provider employee survey may be as follows:

Identify your positional level—upper management, middle level management?

Do you feel like you have a clear understanding of your role relative to the customer?

What is that role?

Who is your primary customer interface? How would you describe that relationship?

Please describe the top three (3) challenges you might encounter daily with the customer.

Do you handle these challenges alone or must you reach back into the company for assistance?

Is your input back to the customer generally timely—in other words, do you have conflicting priorities? If yes, how do you resolve these?

Do you feel like you have enough authority to do the customer job you are tasked to do? If not, what authority would you need to help you expedite the work you must accomplish?

If you could change anything about your role supporting the customer, what would it be?

If you could change any customer driven process, what would it be? In other words, if you could-make a process better, which process would that be and what would you do?

Is there any experience that you can remember over the past year, where we possibly were not seen in the best light? Please describe. Was that problem resolved?

Is there anything you would change internally to make your job easier with respect to company x, recognizing you are beholden to certain reporting requirements, etc.?

If you could recognize an employee of your client with whom you work closely who would that be and what would you recognize that employee for?

If you could recognize a fellow corporate individual working on this contract, who would you recognize and what would you recognize that individual for?

Do you feel that you are recognized for a job well done? By the customer? By company x?

Do you have any suggestions for improving and or expanding the relationship with your customer and the work you provide them? Is there information or are there deliverables that should be provided that are not provided today?

Are you concerned at all about re-competing this contract in the future? Why or why not?

Who do you see as your biggest competitor for a potential re-compete? Why?

Across the customer base, who do you think is the biggest advocate for company x at the mid-level and senior level management areas?

Across the customer base, who do you think is the weakest advocate for company x at the mid-level and senior level management areas?

Do you have any other comments about the work environment?

Would you prefer your input be anonymous?

An objective of the client employee survey is to determine if mid-tier management is cognizant of the service provider (company x) and, if so, has an opinion of their performance. A related objective is to uncover potential areas for improvement.

Typical questions for an exemplary client employee survey may be as follows:

Over how long a period have you known members of company x?

Thinking about your most recent contact with company x, how would you rate the ability of the representative with whom you communicate to assist you in getting someone who could help you?

What was the representative's overall knowledge of your problem or question?

Was the representative helpful?

Would you change the structure of the help that was provided in terms of written deliverables?

Do you sense that there is corporate reach back—in other words, if you need more in-depth assistance to a problem, do you feel that you can get that from this company? Do you know how to request that assistance?

Company x has been supporting you in the area of

If you were to get new similar work, would you consider expanding company x's contract to have them support you or would you go out with a competitive bid?

Would you rate your overall relationship with company x as excellent, good, or fair?

Why? What could be done to improve it (or what recent event made you consider it excellent)? If the company were to request a letter of appreciation for that event, would you support moving that request through the process?

How do you normally elevate issues?

Do you have contacts up the chain of command in company x? Would you be comfortable calling on them with an issue?

Do you feel like you have a venting mechanism and are you open to using it?

How would you rate company x in terms of value/price?

What was the last best interaction you had with company x?

What was the last best interaction your team had with company x?

Has company x helped you solve any complex issues within your directorate?Across the enterprise? Across the agency?

If you could change anything about company x, what would it be?

How would you rate company x in terms of finding backfills?

How satisfied are you with the service of company x?

Do you believe company x is technically competent?

Do you believe company x is professional and courteous?

Is there anyone from company x you would like to see receive recognition? Would you support a letter of appreciation?

Is there anyone you'd like to see replaced? Why? What if the deficiencies were corrected?

Has company x done anything in the past year that you wished they had not done?

Are you open to receiving information from company x on any of the comments requiring action above?

Over and above your current contract with company x, if money was no option, what would you like to see in terms of support or deliverables?

Because the disclosed embodiments create a unique triadic partnership between a provider of products and/or services, a client, and an independent third-party consultant, the relationship between the provider and the client may be significantly enhanced. Real time client feedback cross-referenced with provider employee feedback with early follow-up, all on an on-going basis, not only may enhance and help in maintaining a viable relationship, but also may mitigate termination of the relationship. The disclosed embodiments include a process that may aid assessment and mitigation of risk to the provider/client relationship. The disclosed process may increase the probability of maintaining a contractual relationship between the provider and a client.

For the purposes of this disclosure, a "provider" includes any of a company providing a product and/or service, a local, state, or federal government agency or department providing a product and/or service, an organization providing a product and/or service, or any other entity that may provide a product and/or service. Also for the purposes of this disclosure, a "client" may include a company, a local, state, or federal government agency or department, an organization, any other entity capable of receiving a product and/or service, or a group of individuals. Also for the purposes of this disclosure, a "consultant" may include an independent third-party working under contract to a provider, and may include a "virtual consultant" (e.g., a machine interface) configured to collect data from a client and/or a provider.

While exemplary embodiments have been disclosed, other embodiments will be apparent to those having ordinary skill in the art from consideration of the specification and practice of the disclosed embodiments. It is intended that the specification and examples be considered as exemplary only with the true scope of protection being indicated by the following claims.

I claim:

1. A process for a product or service provider to increase the probability of maintaining a contractual relationship between the provider and a client, the process comprising:

securing, by the provider, the services of an independent third-party consultant working under contract to the service provider;

obtaining, by the provider, authority from the client for the consultant to interview employees of the client regarding aspects of the product or service that has been provided under the contractual relationship by the provider;

conducting personal interviews, by the consultant, with employees of the provider associated with the contractual relationship;

collecting a first feedback data set via machine interface regarding the contractual relationship and the product or service provided by the provider to the client from the perspective of the employees of the provider into a database;

identifying employees of the client associated with the contractual relationship to conduct personal interviews with based on the personal interviews conducted with employees of the provider by the consultant;

conducting personal interviews, by the consultant, with at least the identified employees of the client that are associated with the contractual relationship;

collecting a second feedback data set via machine interface regarding the contractual relationship and the product or service provided by the provider to the client from the perspective of the interviewed employees of the client into the database;

providing, by the consultant, interim reports to the provider regarding feedback data received from the employees of the client;

implementing an analysis of the first and second data sets via a computer programmed to compare the first and second data sets and assess areas of similarity and areas of difference between the first and second data sets;

identifying, based on feedback data from the employees of the provider and the employees of the client, positive and negative aspects of the contractual relationship;

developing, by the consultant, reports categorizing the feedback data into positive and negative aspects of the contractual relationship, categorizing the feedback data into overall environment, organizational effectiveness, contractual effectiveness, performance, and quality of personnel, highlighting areas of concern to the probability of maintaining the contractual relationship, and establishing actionable items to increase the probability of maintaining the contractual relationship;

assigning the actionable items to management teams of the provider for discussion with the client; and identifying, by the consultant, aspects of feedback data collected from the employees of the provider and the employees of the client relevant to bids by the provider for renewing a contractual relationship with the client.

2. A process for risk mitigation and assessment in a contractual relationship between a service provider and a client, the process comprising:

conducting a customer service audit by an independent third-party consultant working under contract to the service provider, the audit including, first, conducting personal interviews with employees of the service provider, determining which employees of the client to conduct personal interviews with based on the interviews conducted with employees of the service provider, and then conducting personal interviews with employees of the client;

receiving via machine interface a first data set regarding services provided by the service provider to the client from the perspective of the employees of the service provider;

receiving via machine interface a second data set regarding services provided by the service provider to the client from the perspective of the employees of the client;

implementing an analysis of the first and second data sets via a computer programmed to compare the first and second data sets and assess areas of similarity and areas of difference between the first and second data sets;

developing at least one report identifying the areas of similarity and areas or difference between the first and second data sets and identifying negative and positive aspects of the contractual relationship based on the analysis of the first and second data sets;

developing a strategy, based on the analysis, for the service provider to assess and mitigate risks to the contractual relationship between the service provider and the client;

implementing the strategy in the contractual relationship between the service provider and the client; and wherein the client includes a government agency.

3. The process of claim 2, further including preparing a first questionnaire tailored to gauge the perception of customer service by the service provider from the perspective of employees of the service provider, and preparing a second questionnaire tailored to gauge the perception of customer service by the service provider from the perspective of the employees of the client, and wherein receiving via machine interface a first data set from employees of the service provider is based on the first questionnaire, and receiving via machine interface a second data set from employees of the client is based on the second questionnaire.

\* \* \* \* \*